United States Patent [19]

Rando

[11] Patent Number: 5,426,507

[45] Date of Patent: Jun. 20, 1995

[54] LASER-BASED PIPE ALIGNMENT DEVICE AND METHOD

[75] Inventor: Joseph F. Rando, Los Altos, Calif.

[73] Assignee: Spectra-Physics Laserplane, Inc., Dayton, Ohio

[21] Appl. No.: 47,630

[22] Filed: Apr. 19, 1993

[51] Int. Cl.[6] ............ G01B 11/00; G01B 11/27; G01C 15/00
[52] U.S. Cl. ............................ 356/399; 33/286
[58] Field of Search ............ 356/399; 33/DIG. 21, 33/286, 228, 290, 293–296; 454/48, 166–172

[56] References Cited

U.S. PATENT DOCUMENTS

| 3,827,155 | 8/1974 | Menzel | 33/228 |
| 3,861,809 | 1/1975 | Hall, Jr. | 356/418 |
| 5,095,629 | 3/1992 | Klemer et al. | 33/293 |

OTHER PUBLICATIONS

Brochure entitled "Product Information Model 929 Air Blower", Spectra-Physics, 8/84.

*Primary Examiner*—Vincent P. McGraw
*Assistant Examiner*—K. P. Hantis
*Attorney, Agent, or Firm*—Killworth, Gottman, Hagan & Schaeff

[57] ABSTRACT

A pipe alignment device and method is provided for efficiently generating an air flow in sections of pipe such that the sections of pipe may be aligned along a prepositioned reference laser beam without refraction errors. A fan blade assembly is supported in one end of the pipe section by a support frame. A motor, mounted on the frame, rotates the fan blade assembly through a plurality of intermeshed gears to generate a air flow in the pipe. The fan blade assembly defines a light transparent aperture which permits the reference laser beam to enter the pipe sections concomitantly with the generated air flow. The light transparent aperture may include a window disposed therein.

22 Claims, 4 Drawing Sheets

LASER-BASED PIPE ALIGNMENT DEVICE AND METHOD

BACKGROUND OF THE INVENTION

The present invention relates generally to laser-based pipe alignment systems which use a reference beam of light along a predetermined path to position sections of pipe and, more particularly, to a pipe alignment device which provides an air flow in the sections of pipe sufficient to reduce deflection of the reference beam of light caused by thermal stratification of the air in the pipe.

Reference laser beam systems have been employed in a number of surveying and construction applications. Laser beam systems have been used, for example, to great advantage in laying sections of pipe, such as sewer pipes. A laser beam transmitter provides a stationary laser beam which passes through the previously positioned sections along a central axis and establishes a reference line of light. A laser beam target having reference indicia thereon is placed in one end of a section of pipe to assist workers in positioning the section. The end of the pipe opposite the laser target is then aligned with the end of the previously laid section. The pipe section is maneuvered until the reference beam of light strikes the reference indicia on the target. Support material such as gravel, is then placed beneath the pipe section, holding it in place.

A continuing problem associated with prior art laser-based pipe alignment systems is the deflection of the laser beam caused by thermal stratification of the air in the pipe. As is well known in the art, the air in long pipe lines stratifies, with the warm air rising to the top of the pipe and the cooler air falling to the bottom of the pipe. This thermal stratification causes the laser beam to refract as a function of the temperature gradient within the pipe. During a construction project, many situations may occur which increase or decrease the temperature of the air in the pipe. For example, the pipe may experience thermal heating from the sun before being installed in the ground or the ambient air may be at a higher or lower temperature than the ground temperature.

The aforementioned refraction problems can be reduced or eliminated by increasing the air flow in the section of pipe. This enhanced air flow causes the air from various portions of the pipe to mix, resulting in more uniform temperatures within the pipe. Prior systems have used remote blowers to produce this air flow. One such blower 100 for increasing the air flow in a section of pipe 102 is shown in FIG. 1. A laser beam, generated by laser transmitter 106, establishes a reference beam of light 107. The blower 100 has a hose 108 and a output nozzle 110 attached thereto. During operation, a worker inserts the output nozzle 110 in one end of the pipe 102. The blower 100 thereafter forces air into the pipe 102 via the hose 108 and output nozzle 110 while the reference beam 107 travels through the pipe 102. The other end of the pipe 102 is aligned with the reference beam 107 using a laser beam target 112 having indicia thereon.

This system, although somewhat successful at reducing beam refraction, experiences less than adequate blower efficiency since the section of pipe is open at the output nozzle end. Thus, a substantial amount of the blown air exits the pipe at the blower end and fails to create air flow through the pipe. Furthermore, the pressure of the air flowing through the hose 108 drops significantly due to the relatively small diameter of the hose. This reduces the pressure of the air emerging from nozzle 110 and the resulting air flow through the pipe 102. The above described prior art system must use a relatively small diameter hose to allow transmission of the laser beam in the pipe concurrent with the generated air flow. Consequently, blower motors must be increased in size to compensate for the loss of air from the open end of the pipe and for the drops in air pressure in the hose.

In view of the shortcomings of the aforementioned prior art blower systems, there is a need for a pipe alignment device which produces air flow in a section of pipe in an efficient manner to reduce the deleterious effects of thermal stratification of the air in the pipe on a reference beam of light.

SUMMARY OF THE INVENTION

This need is met by the improved pipe alignment device and method of the present invention wherein the air flow is efficiently generated by a fan blade assembly inserted into one end of a pipe. The pipe alignment device includes a light transparent aperture such that a reference beam of light may be transmitted through the aperture and into the pipe concurrently with the generation of the air flow to significantly reduce the deleterious effects of thermal stratification on the reference beam of light.

In accordance with one aspect of the present invention, a pipe alignment device for providing air flow in a pipe concomitant with transmission of a reference beam of light in the pipe is provided. The device comprises air movement means for providing air flow in the pipe. A support means supports the air movement means and defines a light transparent aperture. The aperture, which preferably includes a window mounted therein, provides for passage of the beam of light into the pipe concomitant with the air flow.

The air movement means may comprise a fan blade assembly, rotatably mounted on the support means, for producing the air flow in the pipe, and rotation means, attached to the support means and the fan blade assembly, for rotating the fan blade assembly to produce the air flow in the pipe.

The support means may include at least one bearing for rotatably mounting the fan blade assembly on the support means. The rotation means may preferably comprise a motor having a rotating shaft, the motor being mounted on the support means. A first gear is mounted on the motor shaft. A second gear, attached to the fan blade assembly, is meshed with the first gear such that the motor rotates the fan blade assembly to produce the air flow in the pipe.

The support means may comprise a frame sleeve for removably inserting the pipe alignment device in one end of the pipe, and a frame, mounted in the frame sleeve, for supporting the air movement means. The frame preferably comprises a center section for supporting the air movement means, the center section defining the light transparent aperture, and at least one support member for supporting the center section in the frame sleeve.

Preferably, the fan blade assembly comprises a center ring, and a plurality of fan blades positioned around the perimeter of the center ring.

In another aspect of the present invention, the pipe alignment device comprises a frame sleeve capable of insertion in one end of the pipe. A frame, mounted in the frame sleeve, defines a light transparent aperture which permits transmission of the beam of light in the pipe. A fan blade assembly, rotatably mounted on the frame, produces the air flow in the pipe when rotated, and rotation means, mounted on the frame, rotates the fan blade assembly.

Preferably, the frame comprises a center section defining the light transparent aperture, and at least one support member for removably mounting the frame in the frame sleeve. The rotation means may include a motor having a rotating shaft, the motor being mounted on the frame, a first gear mounted on the shaft, and a second gear attached to the fan blade assembly and meshed with the first gear such that the motor rotates the fan blade assembly to produce the air flow in the pipe.

A collar may be provided to permit the pipe alignment device of the present invention to be used with different size pipes. The collar, which may be an inflatable tube or a plurality of flexible annuli, may be circumferentially located around the frame sleeve.

In yet another aspect of the present invention, a method is provided for positioning a first section of pipe along a predetermined path, the first section having a first end and a second end. The method comprises the steps of: positioning the first end of the first section in the predetermined path; generating a reference beam of light along the predetermined path; positioning a pipe alignment device at the first end of the first section, the pipe alignment device being capable of producing air flow in the pipe and permitting passage of the beam of light into the first section; using the pipe alignment device to produce air flow in the pipe; and aligning the second end of the first section based on the reference beam of light.

Preferably, the method further includes the step of positioning a light beam target at the second end of the first section, the light beam target having reference indicia thereon. The step of aligning the second end of the first section comprises the step of aligning the reference indicia and the reference beam of light.

The step of positioning a pipe adjustment device may comprise the step of removably mounting the pipe alignment device in the first end of the first section. Preferably, the step of using the pipe alignment device to produce the air flow comprises the step of rotating a fan blade assembly having at least one fan blade.

In addition, the method for positioning a pipe line having a first section and a second section may further comprise the steps of: providing a second section of pipe having a first end and a second end; aligning said first end of the second section of pipe with the second end of the first section of pipe; and aligning the second end of the second section of pipe based on the reference beam of light.

It is thus a feature of the present invention to provide a pipe alignment device and method for aligning a pipe with a reference beam of light wherein air flow is generated in the pipe in an efficient manner concomitantly with the transmission of the beam of light in the pipe.

Other features and advantages of the invention will be apparent from the following description, the accompanying drawings and the appended claims.

DETAILED DESCRIPTION OF THE INVENTION

Figure 1:
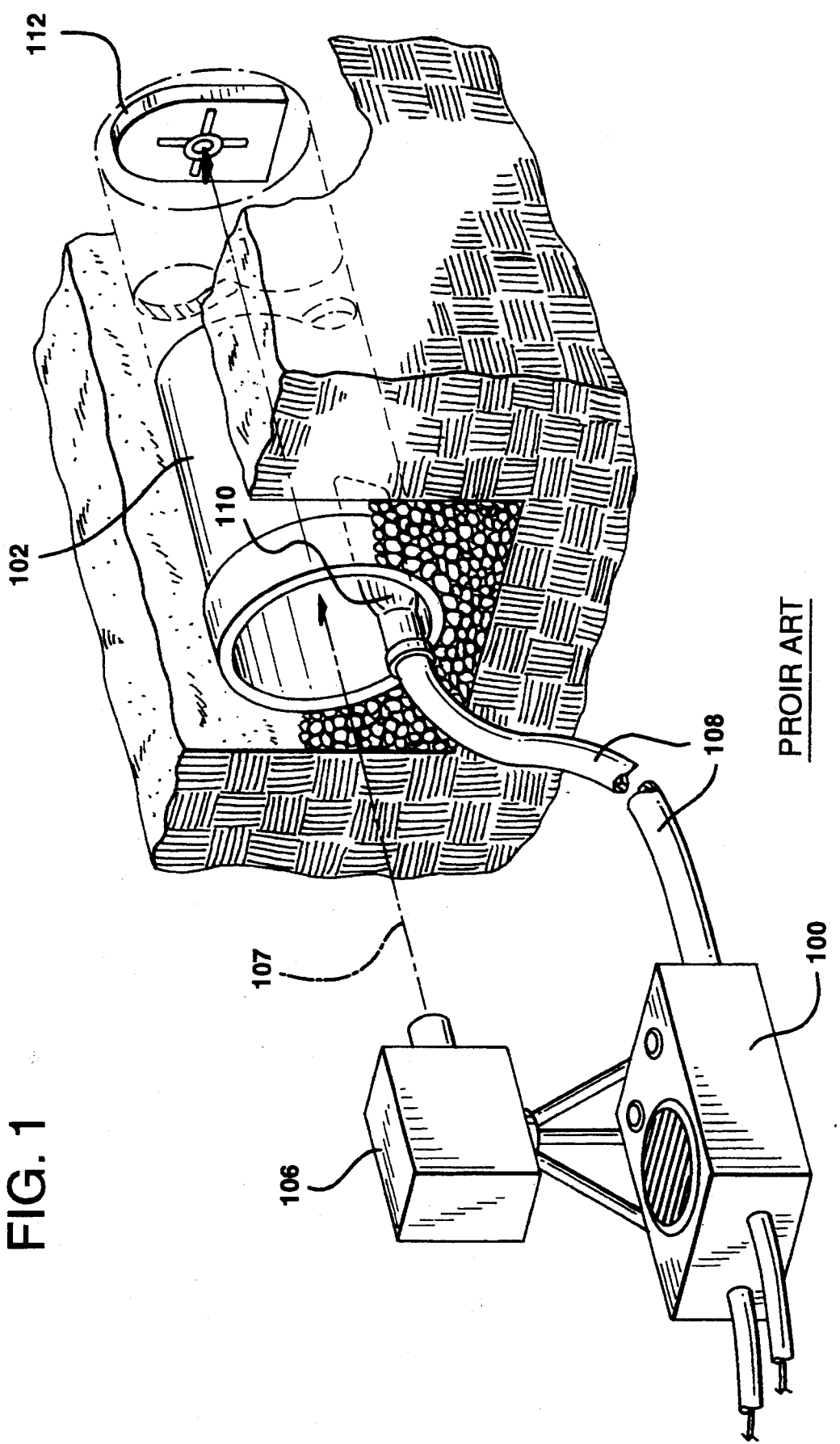
FIG. 1 shows a prior art laser-based pipe alignment system.
Figure 2:
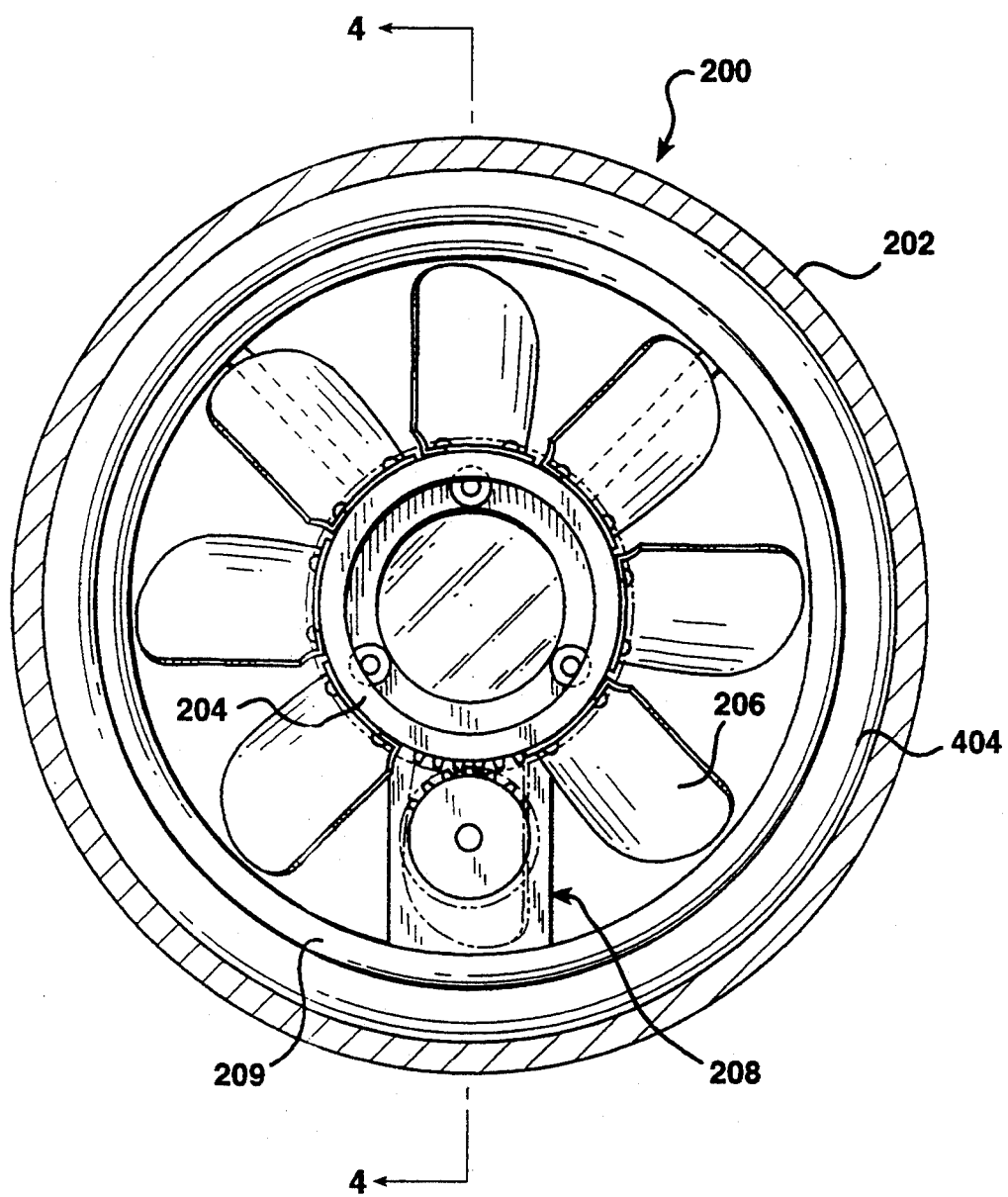
FIG. 2 is a front plan view of a pipe alignment device positioned in a section of pipe in accordance with the present invention.
Figure 3:
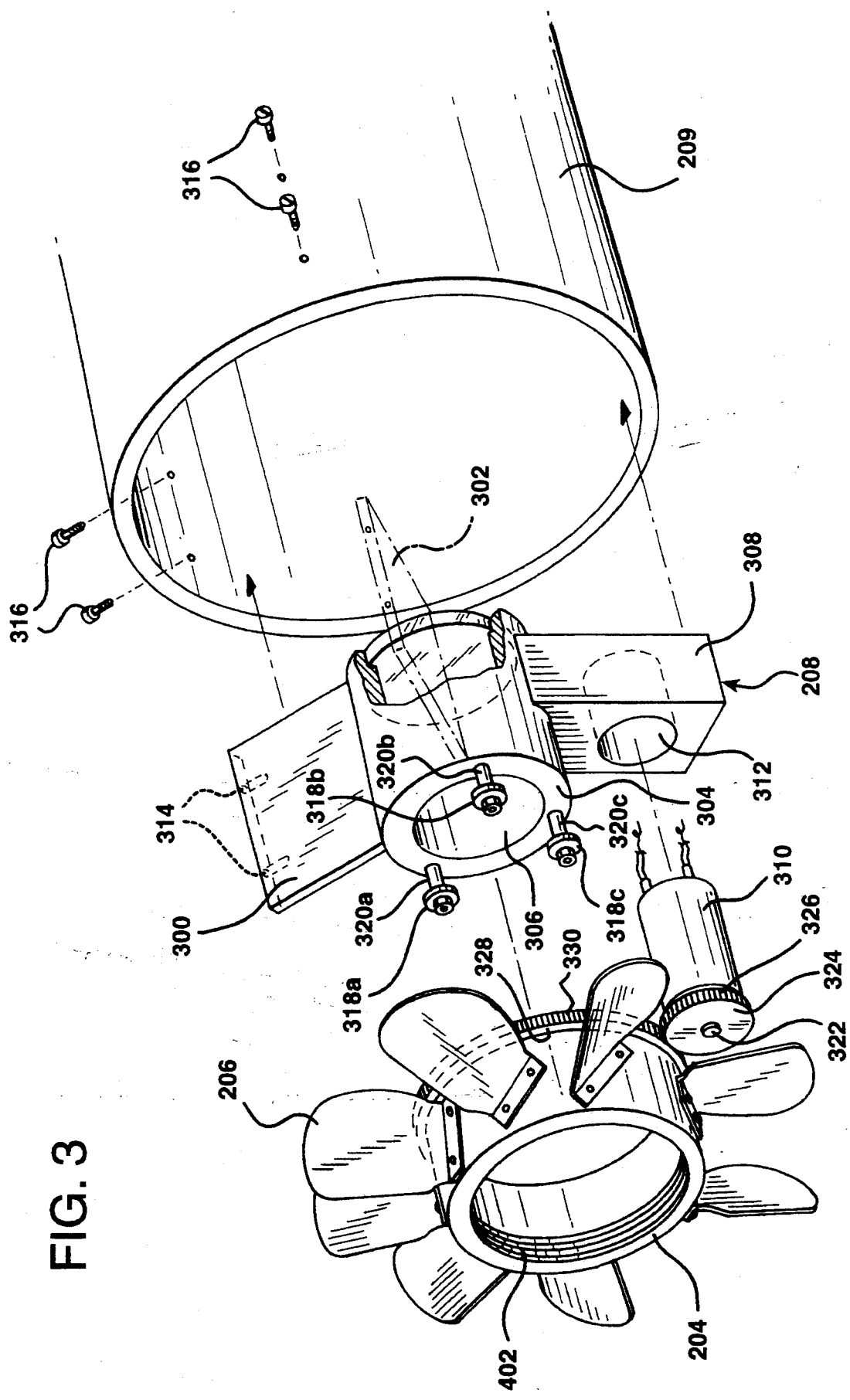
FIG. 3 is an exploded, perspective view of the pipe alignment device shown in FIG. 2.
Figure 4:
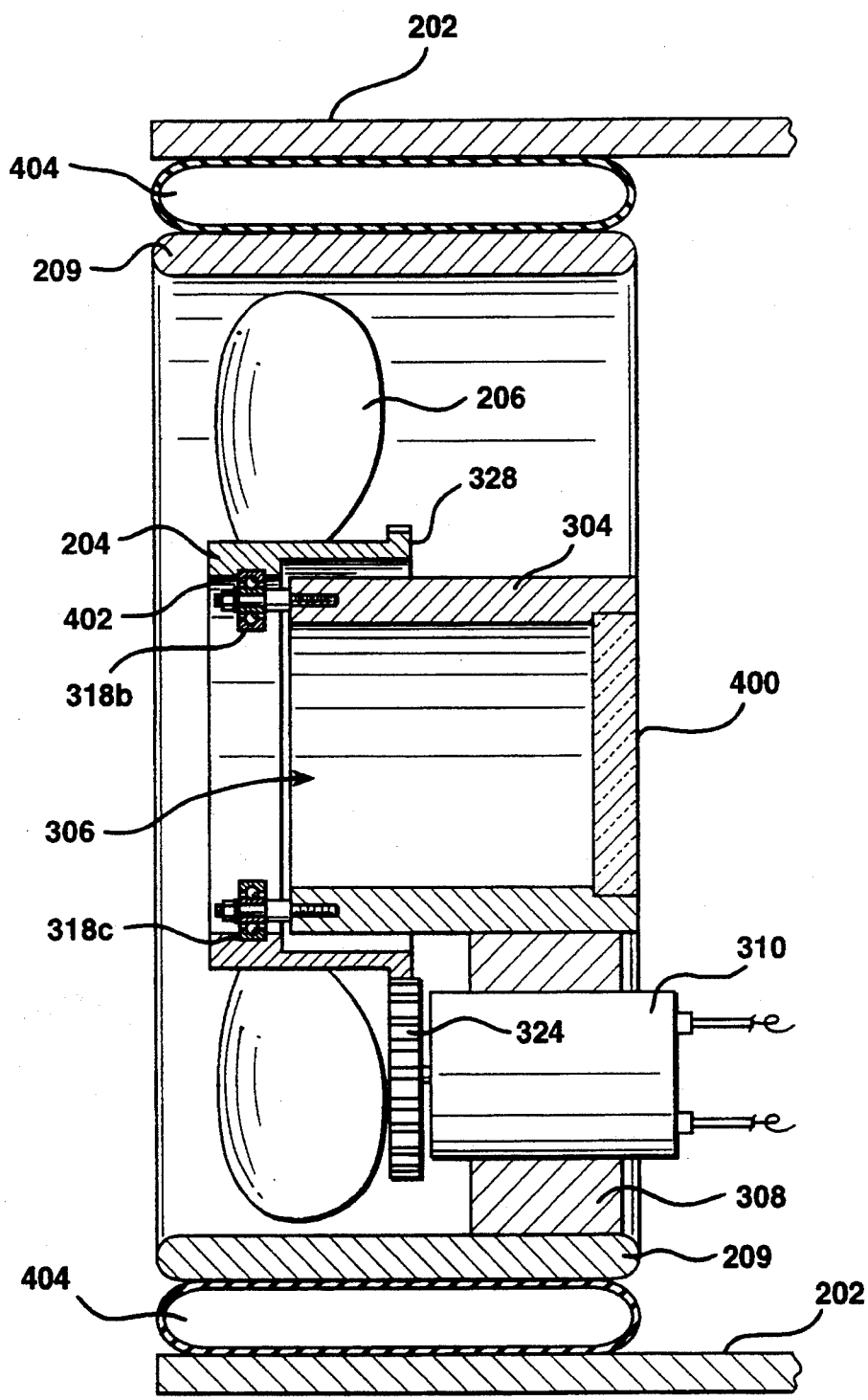
FIG. 4 is a cross sectional view of the pipe alignment device shown in FIG. 2 taken along section lines 4—4.

A pipe alignment device 200 in accordance with the invention for providing a air flow in a pipe 202 that is effective in eliminating or significantly reducing thermal stratification while concomitantly transmitting a reference beam of laser light in the pipe 202 is shown in FIGS. 2 through 4. The pipe alignment device 200 includes a fan blade assembly comprising a center ring 204 having a plurality of fan blades 206 positioned around the perimeter thereof. The fan blades 206 may be angularly oriented to increase the air flow produced by rotation of the blades 206. The air flow generated by the fan blade assembly is generally in a corkscrew motion. As is known in the art, a corkscrew air flow is generally the best method to eliminate or reduce thermal stratification.

The fan blade assembly is rotatably supported by a support means including a frame 208 inserted in a frame sleeve 209 which is designed to be inserted into the pipe 202. As shown in FIG. 3, the frame 208 has a pair of support members 300 and 302 extending outwardly from a tube-shaped, center section 304. The center section 304 defines a light transparent aperture 306 which may be open or which may have a window disposed therein, as shown in FIG. 4 at 400. Thus, a reference beam of light may be transmitted through the aperture 306 concomitant with the generation of air flow in the pipe 202 by rotation of the fan blade assembly.

A third support member 308 also extends outwardly from the center section 304. In combination, the three members 300, 302 and 308 provide support for the pipe alignment device 200 in the frame sleeve 209. As should be apparent, any number of stationary members may be used to support the pipe alignment device 200. The third stationary member 308 further includes means for mounting a motor 310, shown as a motor aperture 312. Although the motor 310 is shown mounting in the aperture 312 of the third stationary member 308, any mounting device may be utilized including a bracket fastened to the member 308.

Fastener holes 314 are provided for securing members 300 and 302 to the frame sleeve 209. Although not shown, support member 308 may include similar fastener holes for securing the respective member 308 to the frame sleeve 209. Screws 316, or other fastening devices, are inserted through the sleeve 209 into each of the holes 314. When fully inserted into holes 314, screws 316 may be flush with the outer surface of the sleeve 209 to facilitate insertion of the sleeve 209 into the pipe 202. It should be understood that the pipe alignment device 200 of the invention does not require that the sleeve 209 provide an airtight seal around the inner diameter of the pipe 202.

The center section 304 of the frame 208 has a plurality of bearings 318a through 318c, mounted on corresponding extended members 320a through 320c, for rotatably mounting the fan blade assembly. As shown more clearly in FIG. 4, the center ring 204 includes an inner channel 402 in which the bearings 318a through 318c are disposed. By placing the bearings 318a through 318c in the channel 402, the center ring 204 may freely rotate while being prevented from moving along the central axis of the pipe 202.

The fan blade assembly is rotated by the motor 310 which has a rotating motor shaft 322. A first gear 324, having a first set of gear teeth 326, is mounted on the motor shaft 322. A second gear 328, having a second set of gear teeth 330, is mounted on the fan blade assembly. The first and second sets of gear teeth 324 and 328 are meshed such that rotation of the motor shaft 322 by the motor 310 rotates the fan blade assembly to produce air flow in the pipe 202. It should be appreciated that the combination of the first and second gears 324 and 328 is exemplary and any number of gear combinations, belt arrangements, or other drive arrangements may be used to interconnect the motor 310 and the fan blade assembly.

The pipe alignment device 200, and in particular the sleeve 209, preferably has an outer diameter such that the device 200 may fit into a 150 millimeter pipe. However, it should be appreciated by one skilled in the art that the diameter of the fan blade assembly may be adjusted, during manufacture, to fit any pipe diameter. In addition, an adjustable seal, such as a collar 404, may be provided to retrofit the pipe alignment device 200 to pipes having a diameter larger than the device 200. As shown in FIG. 4, the collar 404 is circumferentially located around the frame sleeve 209 to seal the end of the pipe 202 substantially. The collar 404 may be any device which seals the area between the perimeter of the sleeve 209 and the inner diameter of the pipe 202 including an inflatable tube, a plurality of flexible annuli or radial petals.

When laying a pipe line, a worker initially places a first end of a first section of pipe in a predetermined position; Any of a number of well known methods may be used to initially position the first end of the first section of pipe. For instance, sewer pipes are usually laid with reference to an outlet on an existing manhole. In this case, the first end of the first section of pipe is connected to the outlet. Alternatively, conventional surveying methods may be used to position the first end of the first pipe section. Once positioned, the first end is secured by an appropriate support material, such as gravel.

The pipe alignment device 200 of the invention is then positioned at the first end of the first section of pipe. Preferably, the pipe alignment device 200 is removably mounted in the first end of the first section of pipe. A laser transmitter transmits a reference beam of laser light through the first end of the first pipe section and along a predetermined path. The laser light enters the first pipe section via the aperture 306. Air flow is generated in the pipe by rotating the fan blades of the fan blade assembly of the pipe alignment device 200. The generated air flow substantially reduces the deflection of the reference beam of laser light caused by thermal stratification of the air within the pipe.

The second end of the first section of pipe is then aligned based on the reference beam of laser light. Typically, the second end is maneuvered until the reference beam of laser light exits the second end along the center axis of the pipe. To facilitate the positioning of the second end, a reference target having indicia thereon may be inserted in the second end to provide a visual indication of the exit position of the laser beam. After being properly positioned, the second end is then secured by the appropriate support materials and the reference target is removed.

A second section of pipe may be then similarly positioned along the predetermined path. The first end of the second pipe section is mated with the second end of the first pipe section. The first end of the second pipe section is then secured in position with the appropriate support material. The second end of the second pipe section is maneuvered based on the reference beam of laser light until the second section is aligned along the predetermined path. As similarly discussed above with respect to the first section of pipe, a reference target may be inserted in the second end of the second section of pipe to facilitate alignment thereof. This procedure may then be continued until the pipe line has been completed.

Having thus described the present invention in detail and by reference to preferred embodiments thereof, it will be apparent that modifications and variations are possible without departing from the scope of the invention as defined in the appended claims.

What is claimed is:

1. A pipe alignment device for providing air flow through a construction pipe having a longitudinal axis concomitant with transmission of a reference beam of light through said pipe, said device comprising:
   air movement means for generating air flow through said construction pipe, said air movement means including a fan blade assembly for producing said air flow through said pipe, said fan blade assembly having a center and defining a first light transparent aperture at said center; and
   support means for supporting said fan blade assembly, rotatably mounted thereon, said support means defining a second light transparent aperture being aligned with said first light transparent aperture and alignable with the longitudinal axis of said construction pipe,
   wherein at least one of said apertures includes a transparent window disposed therein, said first aperture, said second aperture and said window permitting passage of said beam of light into said construction pipe along its longitudinal axis concomitant with said air flow.

2. The pipe alignment device as recited in claim 1 wherein said second light transparent aperture defined by said support means includes a transparent window disposed therein.

3. The pipe alignment device as recited in claim 1 wherein said air movement means further comprises:
   rotation means, attached to said support means and said fan blade assembly, for rotating said fan blade assembly to produce said air flow in said pipe.

4. The pipe alignment device as recited in claim 3 wherein said support means comprises at least one bearing for rotatably mounting said fan blade assembly on said support means.

5. The pipe alignment device as recited in claim 3 wherein said rotation means comprises:
   a motor having a rotating shaft, said motor being mounted on said support means;
   a first gear mounted on said shaft; and
   a second gear, attached to said fan blade assembly, being meshed with said first gear such that said motor rotates said fan blade assembly to produce said air flow in said pipe.

6. The pipe alignment device as recited in claim 3 wherein said fan blade assembly comprises:

a center ring defining said first light transparent aperture; and a plurality of fan blades positioned around the perimeter of said center ring.

7. The pipe alignment device as recited in claim 1 wherein said support means comprises:

a frame sleeve for removably inserting said pipe alignment device in one end of said pipe; and a frame, mounted in said frame sleeve, for supporting said air movement means.

8. The pipe alignment device as recited in claim 7 wherein said frame comprises:

a center section for supporting said air movement means, said center section defining said second light transparent aperture; and at least one support member for supporting said center section in said frame sleeve.

9. A pipe alignment device for providing air flow through a construction pipe having a longitudinal axis concomitant with transmission of a reference beam of light through said pipe, said device comprising:

a frame sleeve capable of being inserted into one end of said pipe;

a frame, mounted in said frame sleeve, for defining a second light transparent aperture to provide transmission of said beam of light in said pipe;

a fan blade assembly, rotatably mounted on said frame, for producing said air flow through said pipe when rotated, said fan blade assembly having a center and defining a first light transparent aperture at said center, said first light transparent aperture being aligned with said second light transparent aperture and alignable with the longitudinal axis of said construction pipe; and rotation means, mounted on said frame, for rotating said fan blade assembly, wherein at least one of said apertures includes a transparent window disposed therein, said first aperture, said second aperture and said window permitting passage of said beam of light into said construction pipe along its longitudinal axis concomitant with said air flow.

10. The pipe alignment device as recited in claim 9 wherein said frame comprises:

a center section defining said second light transparent aperture; and at least one support member for removably mounting said frame in said frame sleeve.

11. The pipe alignment device as recited in claim 9 wherein said rotation means comprises:

a motor having a rotating shaft, said motor being mounted on said frame;

a first gear mounted on said shaft; and a second gear attached to said fan blade assembly and being meshed with said first gear such that said motor rotates said fan blade assembly to produce said air flow in said pipe.

12. The pipe alignment device as recited in claim 9 wherein said frame comprises at least one bearing for rotatably mounting said fan blade assembly on said frame.

13. The pipe alignment device as recited in claim 9 wherein said fan blade assembly comprises:

a center ring defining said first light transparent aperture; and a plurality of fan blades positioned around the perimeter of said center ring.

14. The pipe alignment device as recited in claim 9 further comprising a collar circumferentially located around said frame sleeve.

15. The pipe alignment device as recited in claim 14 wherein said collar is an inflatable tube.

16. The pipe alignment device as recited in claim 14 wherein said collar is a plurality of flexible annuli.

17. A method for positioning a construction pipe line having at least a first section of construction pipe along a predetermined path, said first section of construction pipe having a longitudinal axis, a first end and a second end, said method comprising the steps of:

positioning said first end of said first section of pipe along said predetermined path;

positioning a pipe alignment device at said first end of said first section of pipe, said pipe alignment device including a fan assembly for generating air flow through said first section of pipe, said fan assembly having a center and defining a light transparent aperture at said center with a transparent window therein, said transparent window being alignable with the longitudinal axis of said first section of pipe;

generating a reference beam of light along said predetermined path, said reference beam of light entering said first section of pipe through said light transparent aperture and said transparent window of said pipe alignment device;

using said pipe alignment device to produce said air flow through said first section of pipe; and aligning said second end of said first section of pipe in response to said reference beam of light in order to align the longitudinal axis of said first section of pipe with said predetermined path.

18. The method as recited in claim 17 further comprising the step of positioning a light beam target at said second end of said first section of pipe, said light beam target having reference indicia thereon, and wherein said step of aligning said second end of said first section of pipe comprises the step of aligning said reference indicia and said reference beam of light.

19. The method as recited in claim 17 wherein said step of positioning a pipe adjustment device comprises the step of removably mounting said pipe alignment device in said first end of said first section of pipe.

20. The method as recited in claim 17 wherein said step of using said pipe alignment device to produce said air flow comprises the step of rotating a fan blade assembly having at least one fan blade.

21. The method as recited in claim 17 further including the steps of:

providing a second section of pipe having a longitudinal axis, a first end and a second end;

mating said first end of said second section of pipe with said second end of said first section of pipe; and aligning said second end of said second section of pipe based on said reference beam of light in order to align the longitudinal axis of said second section of pipe with said predetermined path.

22. The method as recited in claim 17 further comprising the step of positioning a light beam target at said second end of said second section of pipe, said light beam target having reference indicia thereon, and wherein said step of aligning said second end of said second section of pipe comprises the step of aligning said reference indicia and said reference beam of light.

* * * * *